United States Patent [19]
Franke et al.

US005766529A

[11] Patent Number: 5,766,529
[45] Date of Patent: Jun. 16, 1998

[54] RESILIENT BIODEGRADABLE PACKAGING MATERIALS

[76] Inventors: Hans G. Franke, 1754 Lagoon View Dr., Tilburon, Calif. 94920; Donald R. Bittner, 1329 Drexel, Irving, Tex. 75601

[21] Appl. No.: 421,720

[22] Filed: Apr. 14, 1995

[51] Int. Cl.⁶ .................................................. B28B 11/16
[52] U.S. Cl. .................... 264/143; 264/288.4; 264/151; 264/210.2; 264/211.11; 264/211.23
[58] Field of Search .................. 264/176.1, 288.4, 264/292, 291, 151, 210.2, 211.11, 211.23, 143

[56] References Cited

U.S. PATENT DOCUMENTS

| | | |
|---|---|---|
| 3,137,592 | 6/1964 | Protzman et al. |
| 4,133,784 | 1/1979 | Otey et al. ............... 260/17.4 ST |
| 4,337,181 | 6/1982 | Otey et al. ............... 523/128 |
| 4,454,268 | 6/1984 | Otey et al. ............... 524/47 |
| 4,673,438 | 6/1987 | Wittwer et al. ............ 106/126 |
| 4,863,655 | 9/1989 | Lacourse et al. ............ 264/53 |
| 5,035,930 | 7/1991 | Lacourse et al. ............ 428/35.6 |
| 5,043,196 | 8/1991 | Lacourse et al. ............ 428/35.6 |
| 5,087,650 | 2/1992 | Willett ....................... 524/47 |
| 5,095,054 | 3/1992 | Lay et al. .................... 524/47 |
| 5,158,810 | 10/1992 | Oishi et al. ................. 428/354 |
| 5,185,382 | 2/1993 | Neumann et al. ............ 521/84.1 |
| 5,186,990 | 2/1993 | Starcevich ................... 428/35.6 |
| 5,208,267 | 5/1993 | Meumann et al. ........... 521/79 |
| 5,248,702 | 9/1993 | Neumann et al. ............ 521/84.1 |
| 5,252,271 | 10/1993 | Jeffs ............................ 264/54 |
| 5,314,754 | 5/1994 | Knight ........................ 428/532 |
| 5,322,866 | 6/1994 | Mayer et al. ................ 524/47 |
| 5,427,614 | 6/1995 | Wittwer et al. .............. 106/213 |

FOREIGN PATENT DOCUMENTS

WO 93/08014   4/1993   European Pat. Off.

*Primary Examiner*—Peter D. Mulcahy
*Attorney, Agent, or Firm*—Greenlee, Winner & Sullivan, P.C.

[57] ABSTRACT

High resiliency biodegradable starch-based extruded products and methods of manufacturing those products are provided. In particular, extruded starch products processed by rolling provide excellent resiliency, abrasion resistance and other properties attractive for use as packaging materials.

24 Claims, 4 Drawing Sheets

RESILIENT BIODEGRADABLE PACKAGING MATERIALS

FIELD OF THE INVENTION

This invention relates generally to expanded biodegradable starch containing products with improved resiliency and other properties appropriate for use as packaging materials. The invention includes an improved method for manufacture of such products and improved expanded starch loose fill and sheets.

BACKGROUND OF THE INVENTION

Light-weight, resilient, compressible and biodegradable materials are presently in high demand for applications in packaging materials. Commonly used polystyrene (Styrofoam™) e.g., ("peanuts"), polypropylene, polyethylene, and other non-biodegradable plastic containing packaging materials are considered detrimental to the environment. The use of such non-biodegradable materials will decrease as government restrictions discourage their use in packaging applications. Biodegradable materials having resiliency, compressibility and bulk density comparable to Styrofoam™ "peanuts" will become increasingly valuable in packaging applications. Biodegradable sheet materials having properties comparable to polypropylene and polyethylene materials will be useful in laminating packaging materials. Starch-based products have been examined for such applications.

Attempts to prepare starch-based products with resiliency and other properties acceptable for packaging materials, particularly for loose fill, have generally focused on chemical or physico-chemical modification of starch or use of expensive high amylose starch to generate expanded starch materials sufficiently resilient for packaging materials. U.S. Pat. Nos. 4,673,438, 4,133,784, 4,337,181, and 4,454,268 relate to starch-based products that have been destructurized or gelatinized by heating under pressure in the presence of water. U.S. Pat. Nos. 4,863,655, 5,035,930 and 5,043,196 relate to expanded starch materials in which the starch has at least 45% by weight amylose (high amylose materials). Starches in these expanded high amylose compositions have also been modified by reaction with oxiranes (e.g. ethylene oxide) and include the commercially available ECO-FOAM™ in which the starch is modified by reaction with propylene oxide. Expanded packaging materials made from high amylose starch are too expensive for practical commercial use. U.S. Pat. No. 5,087,650 relates to addition of graft polymers to starch to make partially biodegradable products with acceptable elasticity and water stability.

In general, extrusion of non-modified starch without polymeric additives results in brittle (non-resilient) materials that have not been commercially useful for packaging applications.

More recently the following patents related to biodegradable starch products have issued:

U.S. Pat. No. 5,186,990 of Starcevich (Feb. 16, 1993) reports a lightweight biodegradable packaging material produced by extrusion of corn grit mixed with a binding agent (guar gum) and water. Corn grit is said to contain among other components starch (76–80%), water (12.5–14%), protein (6.5–8%) and fat (0.5–1%).

U.S. Pat. No. 5,208,267 of Neumann et al. (May 4, 1993) reports biodegradable, compressible and resilient starch-based packaging fillers with high volumes and low weights. The products are formed by extrusion of a blend of non-modified starch with polyalkylene glycol or certain derivatives thereof (up to 10% by weight) and a bubble-nucleating agent, such as silicon dioxide. The nucleating agent is said to enhance bulk resiliency and uniformity of cell structure of the extruded products. The starch blend is "preconditioned" by steam injection prior to addition to the extruder. Bulk resiliency of the exemplified wheat starch products (shaped as small or large tubes) ranged from a low of 56.8% (0.5% silicon dioxide, small tube) to a high of 69.9% (6.0% PEGC [a polyethylene glycol derivative with molecular weight 20,000], 1.0% silicon dioxide, large tube). Bulk densities for these exemplary products was 1.69 lbs/ft$^3$ and 1.22 lbs/ft$^3$, respectively.

U.S. Pat. No. 5,252,271 of Hyrum (Oct. 12, 1993) reports a biodegradable closed cell light weight packaging material formed by extrusion of a modified starch. Non-modified starch is reacted in an extruder with certain mild acids in the presence of water and a carbonate compound to generate $CO_2$. Resiliency of the product is said to be 60% to 85%, with density less than 0.032 g/cm$^3$.

U.S. Pat. No. 5,314,754 of Knight (May 24, 1994) reports the production of shaped articles from high amylose starch. A hot melt is formed under pressure at elevated temperature from a mixture of high amylosic starch with water and with optional plasticizers and lubricants and extruded to form a shaped article. The hot melt is subjected to atmospheric or subatmospheric pressure just prior to extrusion or to subatmospheric pressure after extrusion to remove water from the hot melt. This first extrudate can then be subject to a second extrusion to form a film or other shaped article. The film produced in the two-step process is said to be highly elastic with elongation before failure from about 80% to 240%.

U.S. Pat. No. 5,322,866 of Mayer et al. (Jun. 21, 194) reports the production of biodegradable blown films from a blend of unprocessed raw starch and the copolymers polyvinyl alcohol (PVA) or ethylene vinyl alcohol (EVA) and may also include plasticizer and lubricant. For blown films useful ranges of PVA or EVA in the starch blend are said to be 20% to 80% by weight. Starting materials for the blown film are introduced into a twin-screw extruder fitted with a blown film die.

SUMMARY OF THE INVENTION

The present invention provides a method for producing an improved high resiliency expanded starch product which comprises extrusion of a starch-containing mixture through an expansion die followed by subjecting the extrudate to pressure perpendicular to the direction of extrusion, for example by use of a rolling device. The rolled extruded strand is then cut to desired length to suit the planned application. Preferably the pressure applied to the hot extrudate strand is sufficient to substantially crush the cells in the extrudate. Surprisingly, crushing the cells of the expanded product significantly improves the resiliency of the product. The preferred method of applying pressure to the extrudate to substantially crush the cells is rolling the extrudate between opposed rollers. The rolled expanded starch product is biodegradable and has high resiliency and other properties attractive for use in packaging materials such as loose fill.

The invention provides improved expanded starch materials having high resiliency for use in packaging applications. These improved starch materials are produced by methods described herein by extrusion combined with a step of crushing substantially all of the cells in the extrudate. The method of this invention can be employed essentially with any starch composition suitable for extrusion. In particular and preferably, the method can be used with starch compositions in which the major ingredient is raw non-modified starch. The method of this invention allows the use of lower levels of plasticizers and humectant in base starch extruder feed than previously known to achieve desired high resiliency properties in the final product.

This invention provides a loose fill expanded starch product with resiliency higher than 50% useful for packaging applications. Loose fill products of this invention have compressibility, flexibility properties comparable to Styrofoam™ loose fill. The methods of this invention are also applied to the manufacture of expanded starch sheet materials. Rolled expanded starch sheets are generally useful in manufacture of laminated materials for packaging applications, such as for manufacture of mailing envelopes and related containers.

In one aspect, the invention provides new resilient expanded starch products. In a second aspect, the invention provides base starch mixtures, extrusion feed mixtures, for production of expanded starch products which contain lower levels of humectants and plasticizers, yet which can be processed into high resiliency (low brittleness) expanded product. In another aspect, the invention provides a new method for manufacture of expanded starch products utilizing a conventional extruder combined with a pressure rolling device. Expanded products can be shaped by the combined effect of extruder die shape and roller configuration. In yet another aspect, the invention provides a new extrusion device in which a conventional extruder is combined with a rolling device which applies pressure to an extrudate perpendicular to the direction of extrusion. The pressure applied being sufficient to substantially crush the cells in the hot extrudate. Additional aspects and features of the invention will become apparent in the following detailed description of the invention.

DETAILED DESCRIPTION OF THE INVENTION

Figure 1:
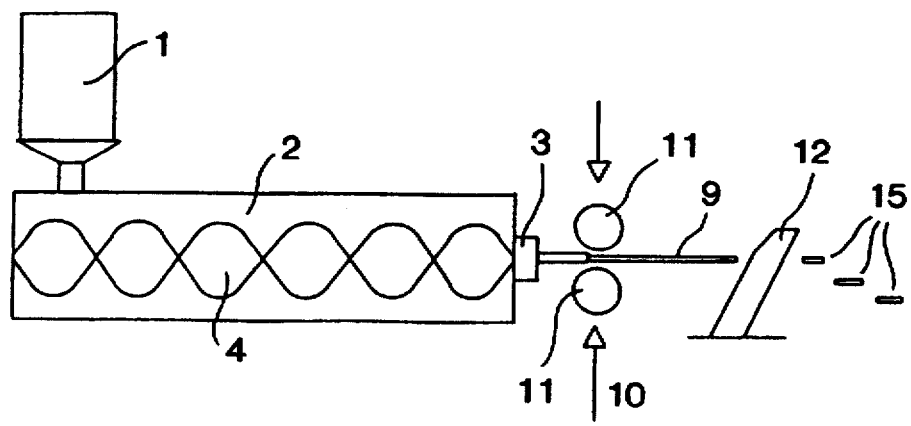
FIG. 1 is a schematic drawing of the extrusion/rolling/cutting device employed to make the biodegradable resilient starch products of this invention.

The improved process of preparing extruded starch products of this invention is described by reference to the schematic manufacturing extrusion apparatus of FIG. 1. Raw non-modified starch is mixed with any desired additives, for example in an attached mixing chamber (1) and introduced into an extruder (2), preferably a twin screw extruder (shown schematically as 4). The mixture is further mixed and blended, subjected to shearing, increasing temperature and pressure in the extruder to form a plasticized mass which is forced through an expanding die (3).

The shape of the die determines the shape of the extruded strand and die shape is typically chosen to prepare a desired shape of expanded product. The mixture is typically extruded out the die at a pressure of about 700 to 2000 psi and the extrudate is at a temperature of about 120° C. to about 200° C. at extrusion. The extruder is typically heated and can have several zones along its length in which temperature is separately adjustable. A pressure drop occurs outside the extruder and steam emitted from the mixture causes it to expand as it exits the die.

Water can be added to the system during the residence of the base starch mixture in the extruder to adjust the extent of expansion of the product. Lubricant levels in the extrudate can also be adjusted to improve flow through the extruder. Glycerin levels in the extruder can also be adjusted to improve flow or vary properties of the expanded product. There is no requirement to remove water from the base mixture in the extruder prior to extrusion. Specifically there is no requirement to apply subatmospheric pressure to the extrudate or extruded strand to remove water.

The extrudate strand (9) is fed through a rolling device (10) having two or more rollers (11) which apply pressure to the strand substantially perpendicular to the direction of extrusion. The rollers form an opening corresponding to the shape of the desired product. The rollers exert sufficient pressure upon the strand to substantially crush the cells in the strand. The rollers also finalize shaping of the expanded product.

The process step of rolling and application of pressure to the extrudate strand perpendicular to the direction of extrusion is an important improvement in the manufacturing process of this invention which results in significantly improved resiliency (decreased brittleness) of extruded starch products. Rolling also reduces dustiness and chipping of extruded products and increased bulk density. The roller pressure required to achieve substantial cell crushing leading to such improved properties depends on the shape of the extrudate, cell size and bulk density of the extrudate which in turn depends on the composition of the extrudate including the type of starch and water content. The required roller pressure needed to achieve the desired cell crushing is readily determined for a particular starch composition and product shape empirically without expense of undue experimentation. In general, roller pressure for making sheet products will be higher than in making shaped loose fill.

The substantially crushed extrudate is cut into desired lengths by a cutting device, for example with a rotating knife (12) positioned after the rollers. The resulting crushed and cut strands (15) are preferably cured under controlled temperature and humidity conditions. Curing is preferably done between 18°–30° C., preferably 21° C. at humidity ranging from about 40%–80%, preferably 50% for up to 1 or 2 days.

The manufacture of expanded starch loose fill and sheets is typically done in a continuous mode by continuous feed into the extruder, extrusion, rolling and cutting.

A conventional twin screw extruder having feed screws, single lead screws, shear paddles (preferably 3 or more, 3–10 being typical) and mixing paddles (typically 1–5) can be employed in this process. A typical expanding type screw configuration can be used in the twin-screw extruder. Typical residence time of the base mixture (i.e. the starch with any additives) in the extruder is from about 9 to 20 seconds and extrusion occurs at a rate from about 100 to 200 lb/h per die insert.

The size and configuration of the die opening determines the cross-sectional shape of the extrudate strand. A variety of shapes and sizes of final loose fill products can be made. The starch can also be extruded as an expanded sheet to make sheets of cushioning material. Typically product sheets of thickness about 1/10 to 1/4 inch can be made by the extrusion/rolling method. Extruded starch products for loose fill packaging material, for example, can have several cross-sectional shapes, including among others, capital omicron, FIG. 8, short rods, S-shaped, C-shaped, oval, and an omega. The product shape does not significantly effect resiliency of loose fill packing material. Bulk density of loose fill is however dependent upon shape.

The rolling device applies pressure to the extrudate strand perpendicular to the direction of extrusion. The hot extrudate strand can simply be passed through opposed flat rollers (which may distort the shape imposed by the die). Preferably the roller or rollers apply pressure symmetrically to the hot extrudate conforming to the desired product shape. Rollers are made of stainless steel, teflon or a related material that is inert to the extrudate. Rollers are preferably positioned with respect to the extruder die such that the hot extrudate strand can be directly fed into the rollers while the extrudate strand is still hot.

Figure 2A:
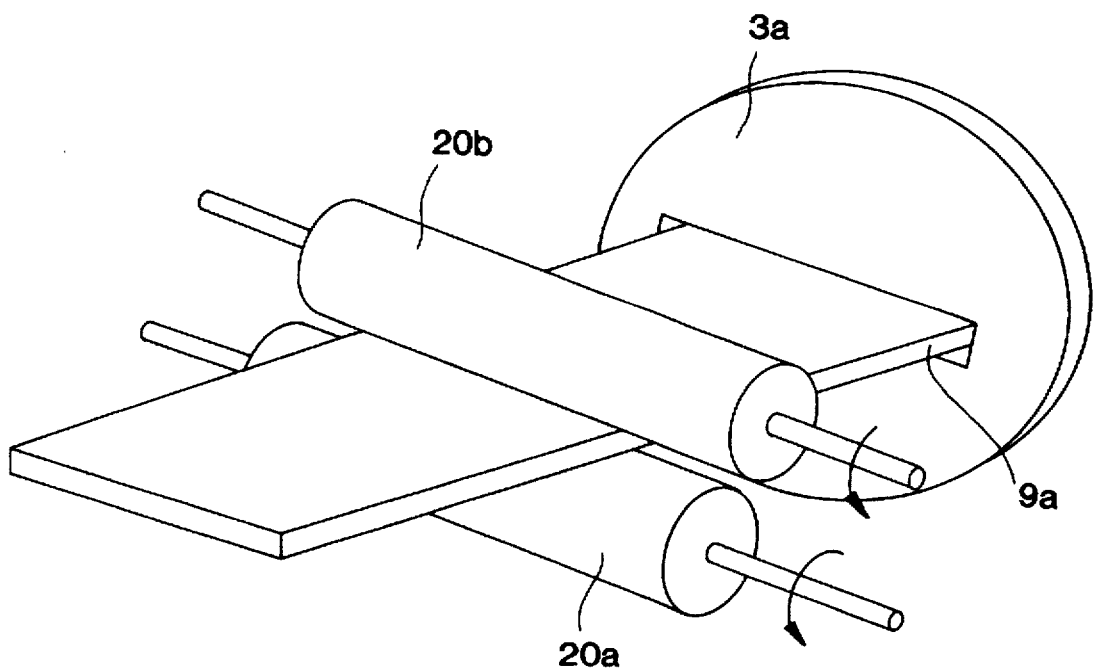
FIGS. 2A–2G are illustrations of various roller configurations that can be employed in the methods of this invention. Roller configurations having 2–4 flat or shaped rollers are illustrated. This figure also provides illustrations of several possible shapes for pieces of loose-fill packaging material, including FIG. 8 and omega shapes among others.
Figure 2B:
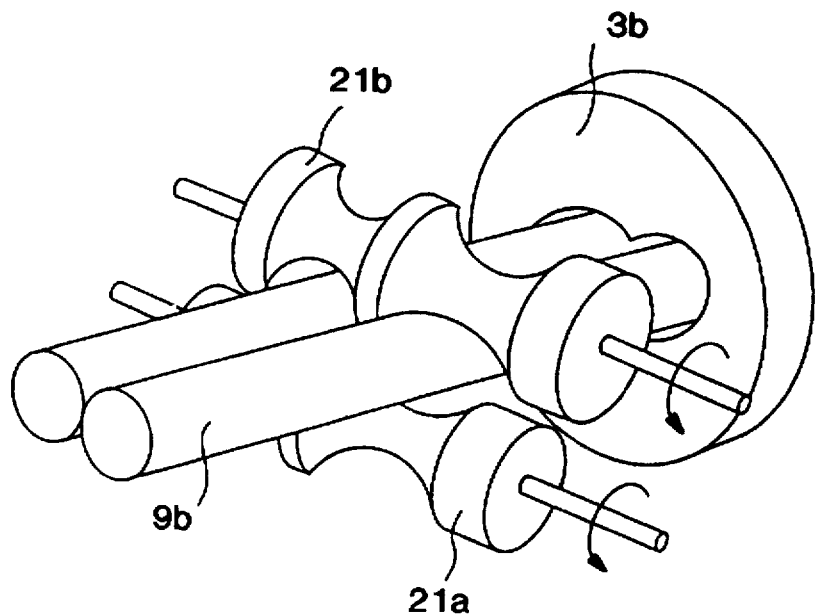
Figure 2C:
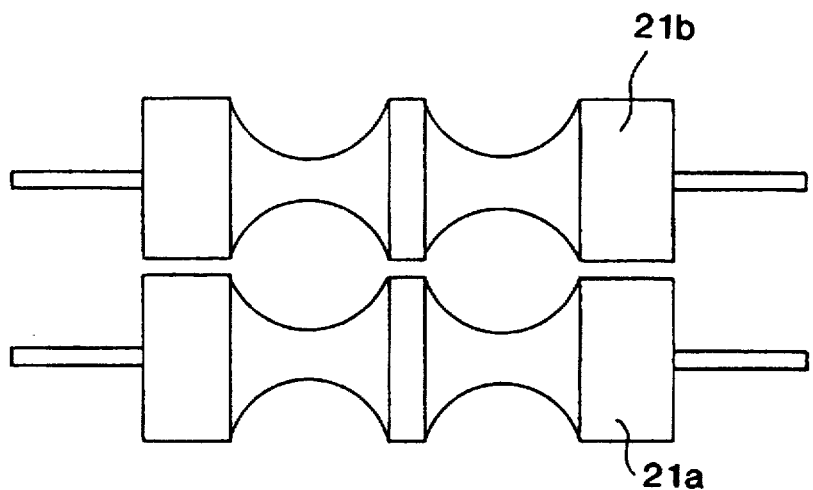
Figure 2D:
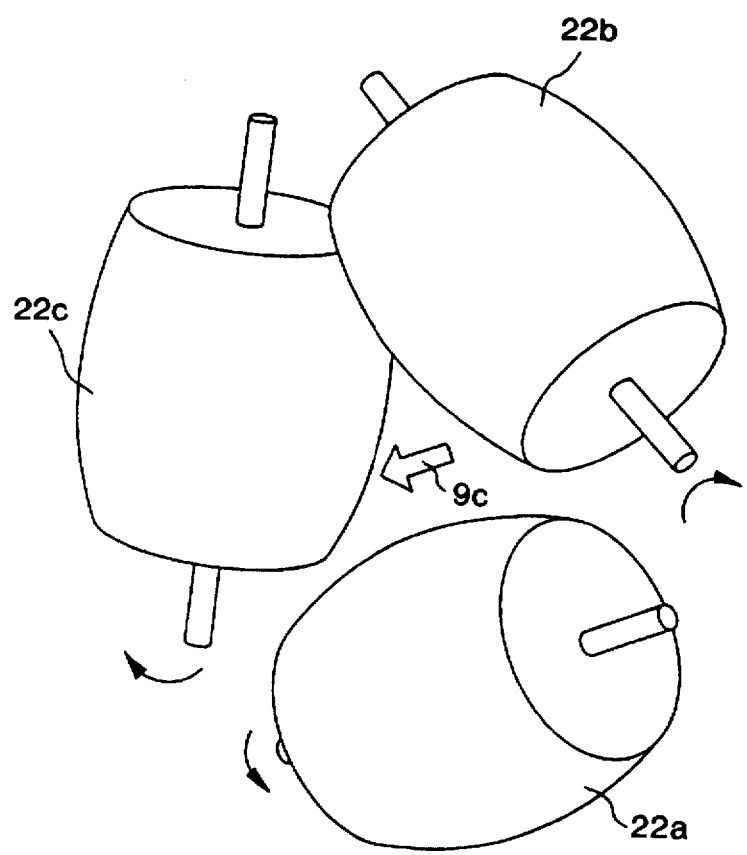
Figure 2E:
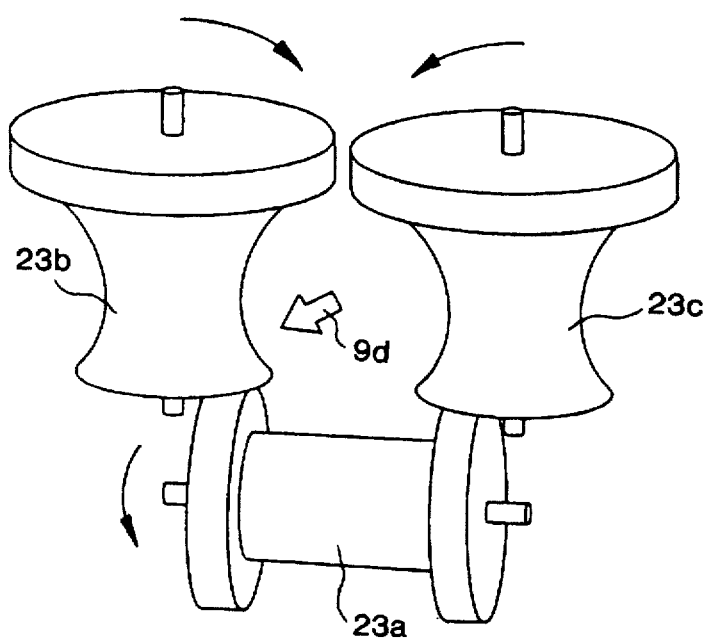
Figure 2F:
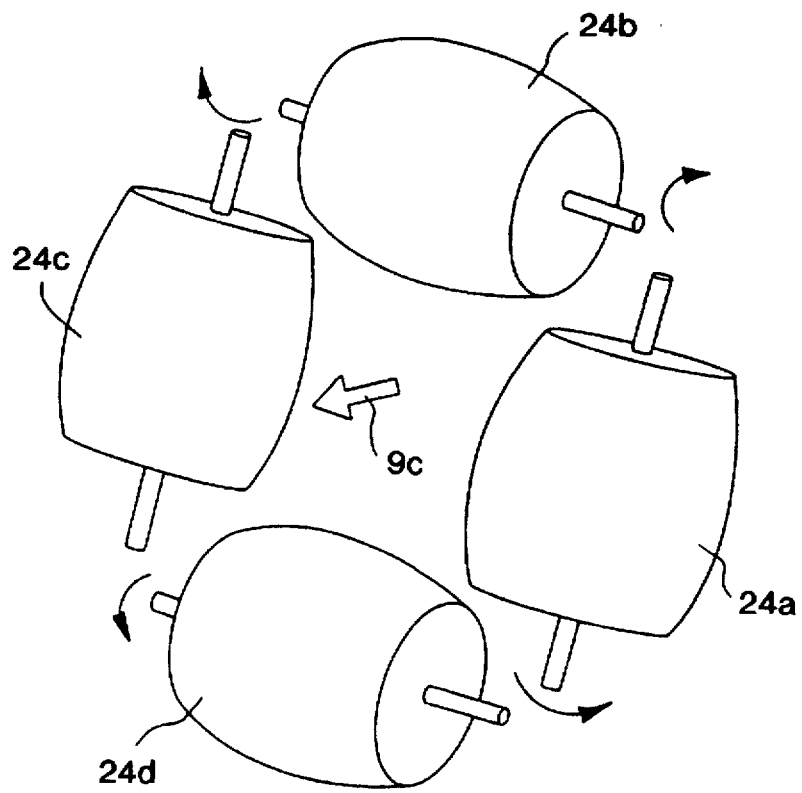
Figure 2G:
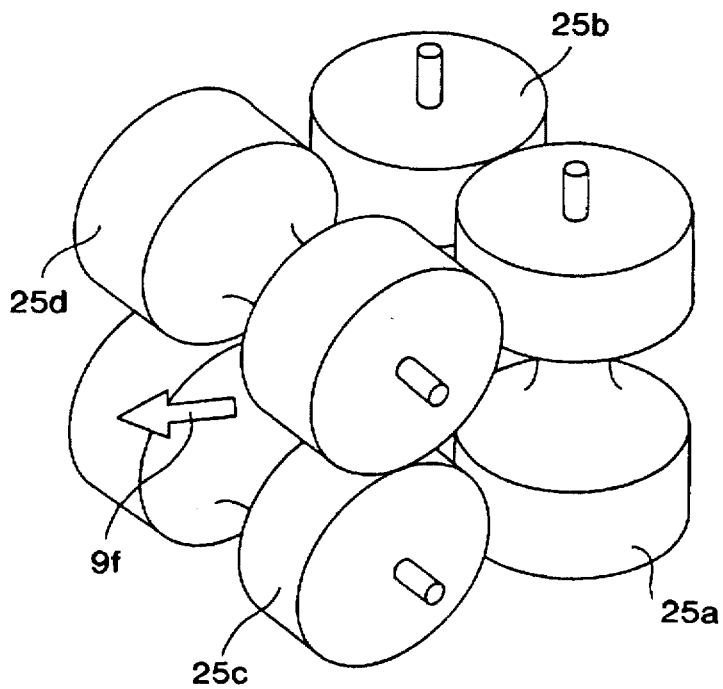

FIGS. 2A–2G illustrate exemplary roller configurations of 1–4 roller combinations. FIG. 2A illustrates the use of two flat rollers (20a and 20b) in combination with a slot-shaped extruder die (3a) for forming the extrudate strand (9a) into expanded starch sheets. FIG. 2B illustrates the use of two opposed rollers (21a and 21b) in combination with die 3b to form FIG. 8 shaped products. The shaped roller configuration 21a and 21b is shown separately FIG. 2C. FIG. 2D illustrates a three-roller configuration (22a, 22b and 22c) to form a triangular-cross section product. The direction of extrusion through the rollers is indicated by the arrow 9c. FIG. 2E illustrates a second three-roller configuration (23a and 23b and 24) to form an omega-shaped product. FIGS. 2F and 2G illustrate two different four roller configurations (25a–d and 26a–d, respectively) that result in products with concave or convex sides. Many other roller configurations containing flat, curved or otherwise shaped rollers can be made to achieved desired product shapes. The directions of extrusion are indicated in FIGS. 2E–2G by arrows labelled 9d–9f. In each of the drawings of FIG. 2 roller spindles and the direction of rotation are indicated.

A rolling step has not previously been applied to the production of expanded starch products. Preferred rollers are spring-loaded and the pressure applied is adjustable. Rolling processes and equipment that is standard in food processing, e.g. processing of doughs, can be readily adapted to use in the manufacturing process of this invention. While rolling is the preferred method for applying pressure to the extruded strand to achieve substantial cell crushing, those of ordinary skill in the art will appreciate that other methods may be applied to achieve the desired result.

Rollers are positioned sufficiently close to the extruder die such that the extrudate remains hot during rolling. For ease of illustration, the roller devices of FIGS. 2A–2G show one set of rollers. Two or more sets of rollers in sequence can be employed in the processing method of this invention. The use of more than one set of rollers may improve efficiency of crushing of cells. For production of starch sheets, in particular, the use of two or more rollers may be required to achieve desired crushing.

The shape of loose fill packaging material affects the interlocking capability of the material. Loose fill shaped so that there is some interlocking between pieces is less readily displaced by jostling and better protects packaged items from impact damage. Loose fill shapes preferred for interlocking capability are those with protrusions or indentations which allow pieces to interlock.

The extrudate of this invention contains raw non-modified starch as the major ingredient (about 70% to about 95% by weight) with added water up to about 30%, minor amounts of additives including lubricant, plasticizer and humectant, nucleating agent and optionally another blowing agent (in addition to water) wherein the additives comprise up to a maximum of 25% by weight of the total weight of the extrudate. Preferred extrudate contains a minimum amount of plasticizers, including polyvinyl alcohol or ethylene vinyl alcohol, to obtain desired resiliency when processed by the improved extrusion/rolling method described herein. In particular, preferred extrudate contains a maximum of 5% by weight of polyvinyl alcohol or ethylene vinyl alcohol.

In preferred embodiments, this invention uses raw, non-modified, non-derivatized starch which is essentially starch as it occurs in nature other than having been physically separated from other plant components. The starch is typically a powder (fine or coarse) or granular. Cornstarch is the preferred starch in this invention, however any type of non-modified starch from wheat, rice, potatoes, tapioca or the like can also be used. The invention does not require the use of high amylose starch to achieve desired high resiliency. The invention does not require the use of derivatized starch, such as starch which has been chemically reacted at the hydroxy groups (e.g. esterified, etherified or phosphorylated). The invention does not require preconditioning of starch by treatment with heat or pressure, gelatinization or destructurization of starch before to addition to the extruder. Nevertheless starch composition with high amylose starch, modified or derivatized starch or starch compositions that are preconditioned, gelatinized or destructurized can be processed by the improved extrusion/rolling process of this invention to provide extruded materials with improved properties for use as packaging materials.

High resiliency expanded starch products of this invention can be prepared with lower levels of plasticizers, particularly polyvinyl alcohol, ethylene vinyl alcohol and related materials than taught in the prior art.

Water in the base starch mixture functions as a blowing or expanding agent. The amount of water in the extrudate is adjusted to maximize expansion of the extruded product while avoiding a soft or runny extrudate. Water can be premixed with or added separately from other base starch mixture ingredients. For example, water can be added and its addition adjusted and controlled through inlet ports into the extruder. The amount of water that must be added depends on the moisture content of the raw starch. The total water content of the base starch mixture prior to extrusion is typically between about 6% and 18%.

The pre-mixed base starch mixture (including water, lubricant and any glycerin) can be directly introduced into the extruder or the individual components can be added in any order into the extruder for mixing therein. In a preferred method of addition of the components, water, lubricant and glycerin are added to the remaining ingredient in the extruder through independently adjustable inlets into the extruder.

The base starch mixture of this invention contains minor amounts of humectants, plasticizers, lubricants, nucleating agents and optional blowing agents and agents which function to reduce cell size. Glycerin, related polyols including pentaerythritol, and vegetable oil among others can function in starch extrusion as humectants and lubricants to improve the flow properties of the mixture and provide smooth surfaces for extrusion. Polyvinyl alcohol, ethylene vinyl alcohol and related polymeric polyols can function as plasticizers. Glycerin can also function as a plasticizer. Talc, protein as grain meal, in egg albumin or blood meal or other protein sources, and materials like Hydrocerol™ can function as nucleating agent.

Hydrocerol™ is a combination of encapsulated sodium bicarbonate and citric acid which generates $CO_2$ and sodium citrate. Glycerol monostearate and other glycerol monoesters of fatty acids can function to aid in formation of uniform small cells in the extruded material. Superheated water in the extrudate acts as a blowing agent. The base mixture of this invention can also include additional minor amounts of blowing agents including among others carbonate salts including sodium, potassium and ammonium salts. Any vegetable oils or polyols employed in the base mixture are preferably pumpable. In general the base starch mixture of this invention can contain combinations of one or more humectants, plasticizers, lubricants, nucleating agents and/ or blowing agents. The maximum amount of these additives is 25% by weight of the total base starch mixture (including added water). The base starch mixture preferably contains a minimum of these additives needed to attain desired properties of extruded product. The base mixture contains a minimum amount of plasticizer to decrease its cost. The rolling step of this invention allows the use of much lower amounts of plasticizers than are required in prior art processes. The preferred base starch mixture of this invention contains a maximum of 5% by weight of polyvinyl alcohol, polyethylene alcohol or related polymeric vinyl alcohols (or mixtures thereof). Preferred base starch mixtures of this invention include those in which the amount of polymeric vinyl alcohol is less than 5% by weight and, specifically, those having less than 2.5% by weight as well as those having less than 1% by weight of polymeric vinyl alcohol. Mixtures of this invention also contain relatively low levels of glycerin or other humectant. Mixtures include those in which glycerin is less than 1.5% and those in which glycerin is less than 0.5%.

For example, the base starch mixture can contain the following ingredients expressed in weight percent: raw unmodified starch (about 70% to about 95%); added water (up to about 30%); vegetable oil (about 0% to about 6%); glycerin (about 0% to about 3%); polyvinyl alcohol (about 0% to a maximum of 5%); proteinaceous grain meal (about 0% to about 5%); glycerol monostearate (about 0% to about 0.5%); additional blowing agent (about 0% to about 0.8%); and talc (about 0% to about 5%) with the provision that the mixture must contain a lubricant, a nucleating agent and some combination of humectant and plasticizer.

The base starch composition of this invention can optionally contain coloring agents, fragrances, bactericides and mold-inhibiting agents.

Resiliency (also called bulk resiliency) is the capability of a material to recover its size and shape, i.e. to recover its original volume, after deformation by a compressive force. Bulk resiliency of a material is assessed as percent recovery of volume by measuring the original volume (as height of a given amount of material in a container) and the volume after about a 30-second recovery from the application of a compressive force. The loose fill products made as described herein will generally have resiliency of 50% or more. Preferred loose fill products will have resiliency over 60%, and more preferred loose fill products will have resiliency of 75% or more. Most preferred loose fill product will have resiliency between about 85% to 95%. In the present invention high resiliency is substantially imparted to shaped expanded products by the physical processing step of rolling the hot extruded product to substantially crush the cells therein. The minor amounts of humectants and plasticizers that are included in the base starch mixture do not in themselves account for the significant improvements in resiliency.

Packaging materials can also be compared and assessed based on their bulk density (weight/unit volume) and bulk compressibility (i.e., the maximum force needed to compress the sample to a preselected % of its original volume, typically to ⅔ of its original volume). Flexibility, the capability to bend without breaking) of loose-fill can be assessed qualitatively by applying hand pressure (squeezing) to the final extruded products to assess how much force can be applied before the extruded product breaks.

Crushed extrudates of this invention have bulk density less than about 2.0 lbs/ft$^3$, but greater than 0.25 lbs/ft$^3$. Typical bulk density for corn starch products of this invention is about 0.5 to 0.8 lbs/ft$^3$. The material as extruded is much lighter than the final product since crushing the cells with the rolling procedure adds bulk density. The expanded starch products have moisture content generally lower than the starch base mixture (e.g., feed material). Typically, the rolled expanded products contain from about 5% to about 9% by weight moisture and more typically from 6% to 7%.

The high resiliency extruded expanded starch products of this invention are useful in applications to shaped articles for packaging materials. In addition to loose fill packaging material, starch sheets for wrapping or other applications can be made by the extrusion/rolling method of this invention. In particular, starch sheets produced by methods herein can be combined with paper and other biodegradable materials to make biodegradable laminated materials, such as mailing envelopes.

The following examples are illustrative of this invention.

EXAMPLES

Example 1

A high resiliency (about 85% to about 95%) loose-fill packaging material in the shape of a rod is prepared employing a base mixture having the following components listed as weight %:

|  | weight % |
| --- | --- |
| unmodified corn starch | 77.7 |
| water | 2.8 |
| vegetable oil | 0.97 |
| glycerin | 1.6 |
| polyvinyl alcohol | 4.9 |
| corn meal | 9.7 |
| Myvaplex ™ (monoglyceride of stearic acid, i.e glycerol monostearate) | 0.39 |
| talc | 1.9 |

The corn starch employed had about 22 wt % amylase and about 8% to 15% water by weight. The polyvinyl alcohol used had molecular weight range 200,000 to 300,000.

These ingredients except water, vegetable oil and glycerine were mixed prior to introduction into the extruder. Water, vegetable oil and glycerine were added independently to the extruder through separate inlets. The extruder employed was a Wenger Model TX52 Twin-Screw Extruder (Wenger Manufacturing, Inc. Sabetha Kans.) which was adapted with feed screws, single lead screws, 5 shear paddles, 10 mixing paddles and a 100 mil diameter die insert to produce a rod-shaped extrudate. The extruder barrel had three temperature zones (150 Z6 [actual temperature 144° C.], 90 Z5 [actual temperature 139° C.] and 70 Z4 [actual temperature not measured]). The screw rpm was 495. The plasticized mass was extruded at a rate of 110 lb/h at 1000 psi and the extrudate was at a temperature of about 175° C. The residence time of the material in the extruder was about 13 seconds.

The extruded material was rolled perpendicular to the direction of extrusion to substantially crush the cells therein. Subsequent to rolling the strand can be cut into small approximately equal-length segments (about 1 inch in length). The expanded, crushed and cut products were cured at 21° C. in a 50% humidity for 24 h. The cured product had excellent resiliency and abrasion resistance.

Example 2

Laminated Kraft Paper for Packaging Applications

A base mixture of this invention is introduced into an extruder, such as the Wenger Twin-Screw Extruder described in Example 1 adapted with a flat or slot die to form extruded sheets (from about 1/10–1/4 inch thick). The extruded sheets are rolled by rollers preferably two sets of flat rollers exerting pressure perpendicular to the extrusion direction and perpendicular to the plane of the sheet. The pressure exerted on the sheet was sufficient to crush substantially all of the cells in the sheet. The crushed sheet is collected, if desired, by winding onto a roll and cut along its width to form desired sheet lengths. The crushed sheet material is cured at about room temperature under medium humidity (about 40–60%).

The resulting pliable starch sheet can be directly employed in packaging applications or can be used in laminated packaging products. Laminated packaging products include among other Kraft paper laminated with pliable starch sheet.

Kraft paper is moistened with water, an appropriately sized starch sheet is positioned over the moistened paper and the layered paper and starch sheet are rolled to ensure overall contact and adhesion of the two layers. Additional layers of paper and or starch sheets can be added by similar steps to obtain a multi-layer laminated material. Kraft paper with a single layer (about 1/10–1/4 inch thick) of starch sheet can be used to fabricate padded envelopes or other mailing containers.

Those of ordinary skill in the art will appreciate that variants, alternatives, substitutes and equivalents of the devices, methods, techniques, expedients, and ingredients specifically described herein may exist and that all such variants, alternative, substitutes and equivalents that can be employed or readily adapted in the methods and compositions of this invention are within the spirit and scope of this invention which is defined by the appended claims.

We claim:

1. A method for making a biodegradable, non-modified starch shaped loose-fill packaging material having resiliency over about 50% which comprises the steps of:

introducing a base starch mixture comprising from about 70% to about 95% by weight non-modified starch onto a twin-screw extruder wherein the base mixture is transformed into a plasticized mass;

extruding said plasticized mass through a die under pressure and temperature conditions such that an expanded extrudate strand is formed;

rolling the expanded extrudate strand while it is still hot to apply pressure perpendicular to the direction of extrusion; and cutting said rolled extrudate strand into portions of a selected length to form said loose-fill.

2. The method of claim 1 wherein pressure is applied to substantially crush the cells in said expanded extrudate strand.

3. The method of claim 1 wherein said base starch mixture comprises the following components listed in weight percent:

unmodified starch (about 70% to about 95%);
added water (up to about 30%);
vegetable oil (up to about 6%);
glycerin (about 0% to about 3%);
polyvinyl alcohol (about 0% to about 5%);
proteinaceous grain meal about 0% to about 5%);
glycerol monostearate (about 0% to about 0.5%);
additional blowing agent (about 0% to about 0.8%);
and talc(about 0% to about 5%).

4. The method of claim 1 wherein said non-modified starch is cornstarch.

5. The method of claim 1 wherein said base starch mixture comprises at most 5% by weight of polyvinyl alcohol or polyethylene alcohol.

6. The method of claim 1 wherein said base starch mixture comprises 0% to about 2.5% by weight polyvinyl alcohol or polyethylene alcohol.

7. The method of claim 1 wherein said base starch mixture comprises less than about 1% by weight polyvinyl alcohol or polyethylene alcohol.

8. The method of claim 1 wherein said extrudate is rolled using a shaped roller.

9. The method of claim 1 wherein said extrudate is rolled using a flat roller.

10. The method of claim 1 wherein said loose-fill packaging material is an omega-shaped loose-fill.

11. A loose-fill packaging material made by the method of claim 1.

12. An improved method for producing an expanded starch loose-fill packaging product by extrusion of a hot expanded extrudate strand wherein the improvement comprises the step of rolling said hot expanded starch extrudate in a roller device which applies pressure to said extruded strand substantially perpendicular to the direction of extrusion of said extrudate.

13. The improved method for claim 12 wherein pressure is applied to said extrudate strand to crush substantially all of the cells in said extrudate strand.

14. An improved method for producing an expanded starch shaped article by extrusion without water removal of a hot expanded extrudate wherein the improvement comprises the step of crushing substantially all of the cells in said extrudate.

15. An improved method for producing an expanded starch shaped article by extrusion without water removal of a hot expanded extrudate wherein the improvement comprises the step of rolling said hot extrudate in a roller device which applies pressure substantially perpendicular to the direction of extrusion of said extrudate.

16. A method for making a biodegradable, non-modified expanded starch, shaped product having resiliency over about 50% which comprises the steps of:

introducing a base starch mixture comprising from about 70% to about 95% by weight non-modified starch onto a twin-screw extruder wherein the base mixture is transformed into a plasticized mass;

extruding said plasticized mass without water removal through a die such that an expanded hot extrudate strand is formed; and rolling the expanded extrudate strand while it is still hot to apply pressure perpendicular to the direction of extrusion.

17. The method of claim 16 wherein said extrusion is done without removal of water from said plasticized mass prior to extrusion and without application of subatmospheric pressure to said extrudate after extrusion.

18. The method of claim 16 wherein said base starch mixture comprises the following components listed in weight percent:

unmodified starch (about 70% to about 95%);
added water (up to about 30%);
vegetable oil (up to about 6%);
glycerin (about 0% to about 3%);
polyvinyl alcohol (about 0% to about 5%);
proteinaceous grain meal about 0% to about 5%);
glycerol monostearate (about 0% to about 0.5%);
additional blowing agent (about 0% to about 0.8%); and
talc (about 0% to about 5%).

19. The method of claim 16 wherein said non-modified starch is cornstarch.

20. The method of claim 16 wherein said base starch mixture comprises at most 5% by weight of polyvinyl alcohol or polyethylene alcohol.

21. The method of claim 16 wherein said base starch mixture comprises 0% to about 2.5% by weight polyvinyl alcohol or polyethylene alcohol.

22. The method of claim 16 wherein said base starch mixture comprises less than about 1% by weight polyvinyl alcohol or polyethylene alcohol.

23. The method of claim 16 wherein said extrudate is rolled using a shaped roller.

24. The method of claim 16 wherein said extrudate is rolled using a flat roller.

* * * * *